(No Model.)
R. EVERETT.
LINE GUIDE FOR FISHING RODS.
No. 343,802. Patented June 15, 1886.
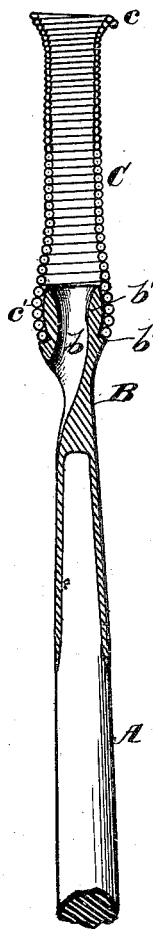
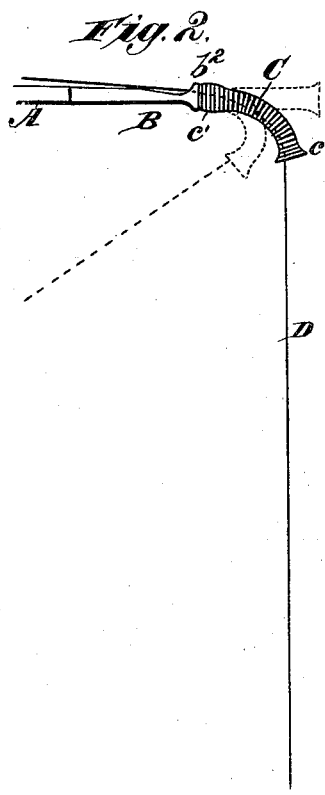
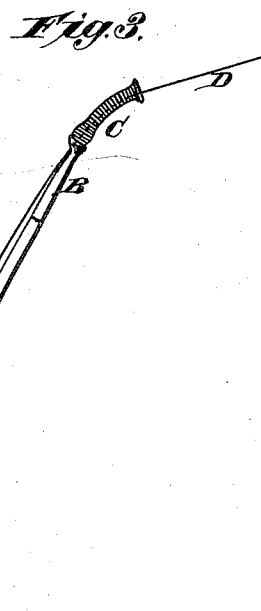
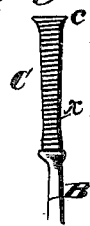
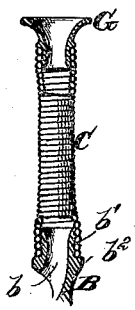
Witnesses
N. Clayfutt
E. H. Bond
Inventor
Robert Everett

UNITED STATES PATENT OFFICE.

ROBERT EVERETT, OF WASHINGTON, DISTRICT OF COLUMBIA, ASSIGNOR OF ONE-HALF TO H. CLAY SMITH, OF SAME PLACE.

LINE-GUIDE FOR FISHING-RODS.

SPECIFICATION forming part of Letters Patent No. 343,802, dated June 15, 1886.

Application filed March 16, 1886. Serial No. 195,415. (No model.)

*To all whom it may concern:*

Be it known that I, ROBERT EVERETT, a citizen of the United States, residing at Washington, in the District of Columbia, have invented certain new and useful Improvements in Line-Guides for Fishing-Rods; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to guides for cords, lines, ropes, or other similar devices designed to receive more or less tension; and the novelty consists in the construction, arrangement, and adaptation of parts, as will be more fully hereinafter set forth, and specifically pointed out in the claims.

The essential object of the invention is to provide means which will, for a cord or the like under tension, avoid short curves or sharp angles, and which will readily accommodate itself to strain coming from various directions.

The invention consists, essentially, of a flexible tube secured to a guide, through which guide and tube the cord or the like is led.

I have illustrated and will describe the invention as applied to guide-tips for fishing-rods; but it is obvious that the important features of the invention would serve efficiently in other relations and combinations.

Guide-tips for fishing-rods are necessarily made so small that the line, when near a right angle with the plane of the rod or any acute angle thereto, will "bind" in the guide, it not being possible within the limits of the tip to make curves of any considerable size. The line being thus abruptly bent at the guide produces a binding friction, which greatly interferes with the "casting" of the line and with a ready "reeling in" of the same. My invention not only avoids these faults, but it provides that the guide-curve shall be "easy" in every direction—a result not possible with ordinary tips, as a curve made easy in one direction with the latter would be necessarily abrupt in the opposite direction.

The invention is illustrated in the accompanying drawings, in which Figure 1 is a section of a guide-tip with my improvement attached. Fig. 2 is an elevation showing in full lines the fishing line under tension, and in dotted lines the guide in an ordinary or normal position and under a back strain. Fig. 3 is an elevation showing the easy manner in which the guide accommodates itself to the direction of the line in long casting. Fig. 4 is a section of a modification, and Fig. 5 is a plan or elevation of a guide having peculiar proportions.

Referring to the drawings, A designates the tip-section of a rod, and B a guide-tip secured thereto in any approved and suitable manner. The tip B has the ordinary guide-aperture, $b$, and is further provided with a neck, $b'$, terminating with a shoulder, $b^2$. The neck $b'$ may be threaded or roughened, as shown in Fig. 4; or it may be of greater diameter some distance from the shoulder $b^2$ than at the junction with such shoulder, as seen in Fig. 1, the object in either case being to provide securing means for my elastic or flexible guide C. The guide C is of coiled metal wire, formed into proper tubular shape over a proper mandrel. It has a flaring mouth, $c$, and the part marked $c'$ is sprung over the neck $b'$.

As shown in Fig. 4, the guide is readily removable, the part $c'$ engaging the roughened or threaded neck $b'$, the contractile force of the wire insuring its efficient attachment. I prefer to spring the wire over the neck $b'$, as seen in Fig. 1, and to then electroplate both tip and guide. The metal deposit will assist in completing the attachment for all practical purposes.

The wire tube may be soldered to the tip, if desired, and for some purposes this may be advisable.

In Fig. 5 I show the coil of less diameter at those points adjacent to the neck. This part of the flexible guide, which for convenience I mark $x$, is thus made to resist a greater strain, upon the theory that the smaller the diameter of a coiled wire tube with a given wire the greater its capacity to resist lateral strain. By thus strengthening the tube at this point I prevent the possibility of a too short bend in case of extraordinary strain.

It will be noticed that with my flexible tubular guide the strain may be changed from one direction to another, and that any position of the rod may be accommodated without the line D being allowed to make a short bend at the tip.

The invention—viz., the flexible tubular guide—may be readily applied to tips now in use.

Modifications in details of construction may be made without departing from the principle or sacrificing the advantages of my invention.

I may secure a thimble-guide, as G, to the outer or free end of the tubular guide, as indicated in Fig. 4.

The part of the tube adjacent to the rod may be re-enforced by having that portion made of a wire of greater diameter, as indicated in Fig. 1.

What I claim as new is—

1. The combination, with a guide, as B, and with a tension-cord, of a tubular flexible guide, as C, as and for the purposes set forth.

2. A flexible line-guide comprising a tube composed of coiled wire combined with a fishing-rod, and arranged to accommodate itself to various directions of the line, so as to allow an easy feed of the line in casting, substantially as set forth.

3. The combination, with a tip, B, of a tubular flexible guide composed of coiled wire secured to the tip, and strengthened or re-enforced at points adjacent to the tip, as set forth.

4. The tip B, having neck $b'$, combined with the flexible line-guide C, composed of coiled wire, as set forth.

In testimony whereof I affix my signature in presence of two witnesses.

ROBERT EVERETT.

Witnesses:
 H. CLAY SMITH,
 PERCY B. HILLS.